US011102273B2

(12) United States Patent
Shanks et al.

(10) Patent No.: US 11,102,273 B2
(45) Date of Patent: Aug. 24, 2021

(54) UPLINK PERFORMANCE MANAGEMENT

(71) Applicant: Cisco Technology, Inc., San Jose, CA (US)

(72) Inventors: Robert Tristan Shanks, San Mateo, CA (US); Vishalsai Haresh Daswani, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 776 days.

(21) Appl. No.: 14/710,874

(22) Filed: May 13, 2015

(65) Prior Publication Data
US 2016/0337212 A1    Nov. 17, 2016

(51) Int. Cl.
*H04L 29/08* (2006.01)
*H04L 12/26* (2006.01)
(Continued)

(52) U.S. Cl.
CPC .......... *H04L 67/10* (2013.01); *H04L 12/6418* (2013.01); *H04L 43/08* (2013.01);
(Continued)

(58) Field of Classification Search
CPC ........................... H04L 67/10; H04L 12/6418
See application file for complete search history.

(56) References Cited

U.S. PATENT DOCUMENTS

| 5,627,766 A | * | 5/1997 | Beaven | G06F 11/0715 |
| | | | | 370/241 |
| 5,793,976 A | * | 8/1998 | Chen | H04L 43/0852 |
| | | | | 370/252 |

(Continued)

FOREIGN PATENT DOCUMENTS

EP    1763172 A1    3/2007

OTHER PUBLICATIONS

Nguyen, Kien et al., "Investigating Performance on Concurrent Virtual Wi-Fi Interfaces", IEEE International Conference on Advanced Information Networking and Applications Workshops, IEEE Mar. 24, 2015, pp. 382-386.

(Continued)

*Primary Examiner* — Jerry B Dennison
(74) *Attorney, Agent, or Firm* — Polsinelli PC

(57) ABSTRACT

Previously available network monitoring and management systems fail to provide an indication about how uplink traffic is handled at or beyond the network access point. By contrast, various implementations disclosed herein provide uplink performance monitoring and management from a client device, which is located on one side of an access point, to a destination that is located on the other side of the access point. For example, in some implementations, a method of uplink performance management is provided that includes transmitting a plurality of uplink test packets from a client device, determining a response to the transmission of the plurality of uplink test packets through the network access point, and generating one or more uplink performance values according to the determined response, the one or more uplink performance values characterizing how uplink traffic is handled between the client device and the destination both to and beyond the network access point.

18 Claims, 8 Drawing Sheets

(51) Int. Cl.
*H04L 12/64* (2006.01)
*H04W 24/06* (2009.01)

(52) U.S. Cl.
CPC ............ *H04L 43/50* (2013.01); *H04L 43/087* (2013.01); *H04L 43/0829* (2013.01); *H04L 43/0858* (2013.01); *H04L 43/0864* (2013.01); *H04W 24/06* (2013.01)

(56) References Cited

U.S. PATENT DOCUMENTS

| | | | | |
|---|---|---|---|---|
| 5,838,919 | A * | 11/1998 | Schwaller | H04L 43/50 709/224 |
| 6,574,737 | B1 * | 6/2003 | Kingsford | H04L 63/1433 709/224 |
| 6,885,641 | B1 * | 4/2005 | Chan | H04L 41/142 370/252 |
| 6,996,064 | B2 * | 2/2006 | Klassen | H04L 43/0888 370/238 |
| 7,133,368 | B2 * | 11/2006 | Zhang | H04L 29/12509 370/249 |
| 7,302,276 | B2 | 11/2007 | Bernhardsson et al. | |
| 7,609,661 | B2 | 10/2009 | Chae et al. | |
| 7,684,345 | B2 | 3/2010 | Lin et al. | |
| 7,729,240 | B1 * | 6/2010 | Crane | H04L 43/0894 370/229 |
| 7,990,887 | B2 * | 8/2011 | Cidon | H04L 43/50 370/253 |
| 8,385,305 | B1 * | 2/2013 | Negus | H04J 1/00 370/338 |
| 2004/0196843 | A1 * | 10/2004 | Zinin | H04L 41/00 370/389 |
| 2005/0163047 | A1 * | 7/2005 | McGregor | H04W 24/00 370/229 |
| 2005/0207354 | A1 * | 9/2005 | Nekovee | H04L 1/1848 370/260 |
| 2008/0212487 | A1 | 9/2008 | Silvestri et al. | |
| 2014/0016487 | A1 | 1/2014 | Dorenbosch | |
| 2014/0040467 | A1 | 2/2014 | Sharad Agarwal | |
| 2014/0160952 | A1 * | 6/2014 | Astigarraga | H04L 43/10 370/252 |
| 2014/0160972 | A1 | 6/2014 | Ketonen | |
| 2015/0181459 | A1 * | 6/2015 | Zhu | H04W 28/0289 370/236 |
| 2015/0318958 | A1 * | 11/2015 | Oishi | H04L 1/08 370/229 |
| 2015/0319064 | A1 * | 11/2015 | Oishi | H04L 1/203 370/241.1 |

OTHER PUBLICATIONS

International Search Report application No. PCT/US2016/030349 dated Apr. 8, 2016.

* cited by examiner

UPLINK PERFORMANCE MANAGEMENT

TECHNICAL FIELD

The present disclosure generally relates to improving the performance of data networks, and in particular, to enabling uplink performance management in data networks.

BACKGROUND

The ongoing development of data networks includes improving access to media services and content offerings that emulate, enhance or even replace services provided by other systems. This has led to surges in both data-intensive and latency-sensitive traffic streams for applications including video streaming, voice calls, video conferencing, music streaming and online gaming. However, data-intensive and/or latency-sensitive traffic streams can strain the finite capacity of existing network infrastructure resources.

In order to meter access to network resources, a network is generally managed based on bandwidth utilization, with nominal levels of bandwidth allocated to client devices. Bandwidth allocations are often closely tied to a subscription tier model, where client devices in each tier (or subscription level agreement, "SLA") receive a respective bandwidth allocation for a corresponding cost. According to many SLAs the downlink channel and uplink channel have different quality of service (QoS) levels. The downlink channel is typically the forward channel to a client device from a network access point (e.g., a head-end node of an ISP). The uplink is typically the reverse channel from a client device to a network access point. An intentional QoS difference between the downlink and uplink channels is often based on a prioritization of data delivery to client devices, because user experience is often more heavily influenced by downlink performance (e.g., speed and fluidity of a download or stream).

Nevertheless, there are many applications in which uplink performance is important to the user experience, such as video conferencing. However, known uplink QoS metrics do not provide an accurate characterization of uplink performance. Known uplink QoS metrics are merely based on assessing whether a SLA specified uplink data throughput level is provided to a client device, but do not provide an indication about how uplink traffic is handled at or beyond the network service provider access point.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
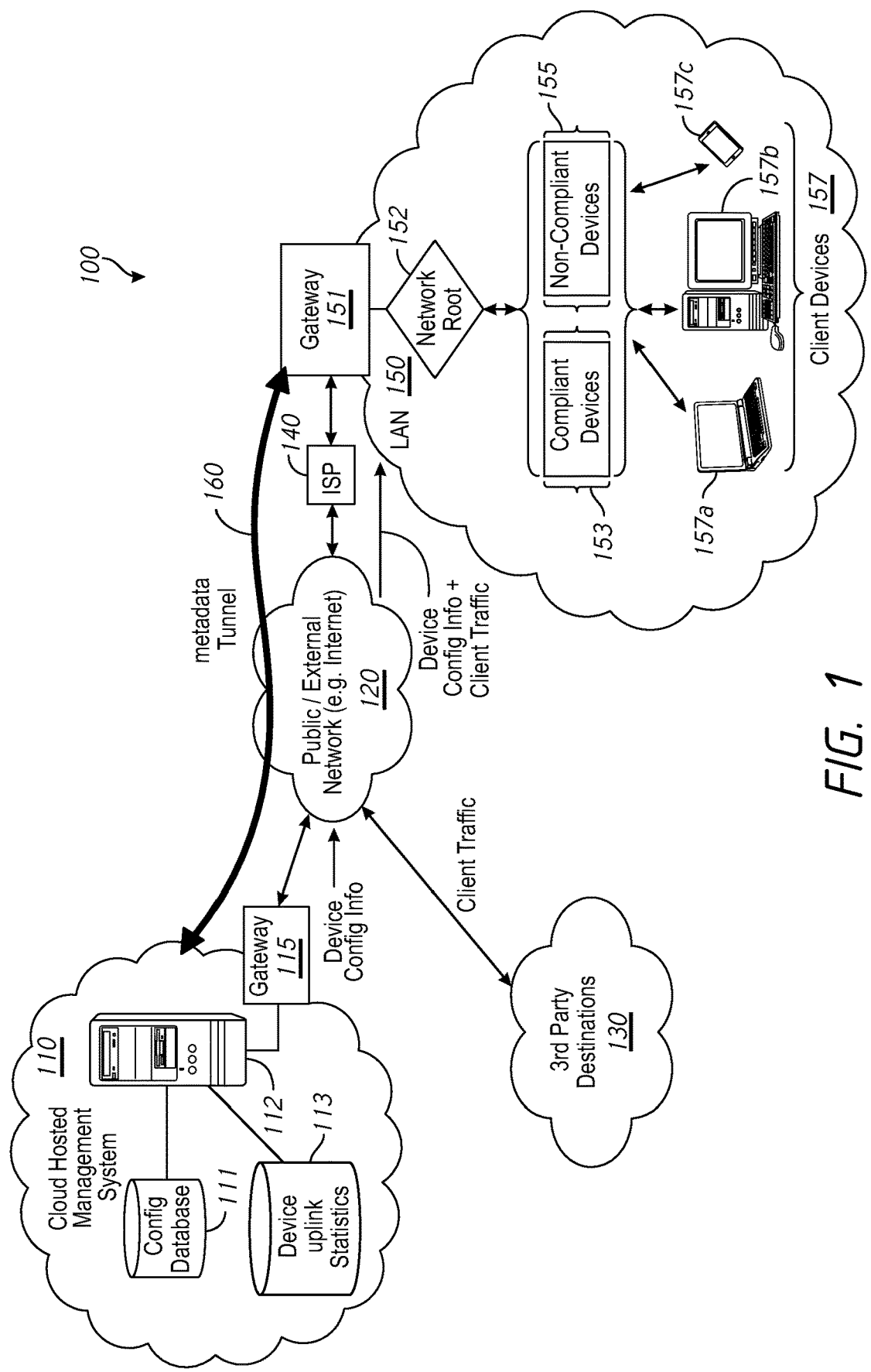
FIG. 1 is a block diagram of a data networking environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

OVERVIEW

Previously available network monitoring and management systems fail to provide an indication about how uplink traffic is handled at or beyond the network access point. By contrast, various implementations disclosed herein provide uplink performance monitoring and management from a client device, which is located on one side of an access point, to a destination that is located on the other side of the access point. For example, in some implementations, a method of uplink performance management is provided that includes transmitting a plurality of uplink test packets from a client device, determining a response to the transmission of the plurality of uplink test packets through the network access point, and generating one or more uplink performance values according to the determined response, the one or more uplink performance values characterizing how uplink traffic is handled between the client device and the destination both to and beyond the network access point.

FIG. 1 is a block diagram of a data networking environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the data networking environment 100 includes a public/external network 120 (e.g., a portion of the Internet), one or more third-party destinations 130 (e.g., providing various third-party content and services), a cloud hosted network management system 110, an Internet service provider (ISP) node 140 and a local area network (LAN) 150.

The one or more third-party destinations 130 provide various third-party content and services, such as email, media content (e.g., video, music, gaming, etc.), online banking, social networking servers, etc. Other than providing sources and/or destinations for client data traffic, an exhaustive description of the numerous examples of third-party destinations are not particularly pertinent to the scope of the present disclosure. As such, no further details pertaining to the one or more third-party destinations 130 are provided for the sake of brevity.

In various implementations, the LAN 150 includes a gateway node 151, a network root node 152, a number of compliant networking devices 153, a number of non-compliant networking devices 155, and a number of client devices 157. The gateway device 151 connects the LAN 150 to the public network 120 through the ISP node 140, and includes features such as a firewall. In some implementations, the gateway device 151 is provided as a single entity (e.g., a server, a virtual machine, etc.). In some implementations, the gateway device 151 includes a distributed system including a suitable combination of software, data structures, virtual machines, computing devices, servers, switches and routers. Merely for the sake of brevity and convenience of explanation, the gateway device 151 is described herein as a single entity.

In some implementations, the root node 152 is a virtual node or logical place-holder within the LAN 150. In such instances, the root node 152 merely provides a convenient LAN node that is separate from the gateway node 151. In some implementations, the root node 152 is an actual physical device that is separate from the gateway node 151. In some implementations, the root node 152 is included as a part of the gateway node 151.

Client devices 157 generally include any suitable computing device, such as a computer, a laptop computer, a tablet device, a netbook, an internet kiosk, a personal digital assistant, a mobile phone, a smartphone, a wearable, a gaming device, a computer server, etc. In some implementations, each client device (e.g., laptop 157a, workstation 157b, smartphone 157c, etc.) includes one or more processors, one or more types of memory, a display and/or other user interface components such as a keyboard, a touch screen display, a mouse, a track-pad, a digital camera and/or any number of supplemental devices to add functionality. In some implementations, a client device includes a suitable combination of hardware, software and firmware configured to provide at least some of protocol processing, modulation, demodulation, data buffering, power control, routing, switching, clock recovery, amplification, decoding, and error control.

In various implementations, the difference between the compliant networking devices 153 and the non-compliant networking devices 155 is based at least on how uplink metadata is processed by each and/or the extent to which a device is able to functionally cooperate with the cloud hosted network management system 110. In some implementations, a non-compliant device erroneously forwards uplink metadata received from one compliant device to another, even though the non-compliant device correctly routes externally addressed traffic received from the compliant devices. That is, while a non-compliant device correctly routes externally addressed traffic towards the gateway node 151, the non-compliant device also incorrectly forwards uplink metadata because it is not configured to recognize and process uplink metadata properly. By contrast, a compliant device in the hypothetical place of a non-compliant device is configured to recognize uplink metadata as information it should use and not forward from one compliant device to another device. Additionally and/or alternatively, in some implementations, in response to a request to do so, compliant devices report their own uplink metadata (e.g., such as LLDP frames) to a requesting device. Additionally and/or alternatively, in some implementations, in response to a request to do so, compliant devices operate in accordance with configuration instructions, software and/or firmware updates, and rules provided by the cloud hosted network management system 110. To that end, in accordance with some implementations, a metadata tunnel 160 is established from the gateway node 151 of the LAN 150 to the gateway node 115 of the cloud hosted network management system 110.

The cloud hosted network management system 110 is configured to manage the configuration and operation of compliant devices in a LAN and/or across geographically distributed portions of a VLAN. To that end, the cloud hosted network management system 110 includes a configuration database 111, a device uplink statistics (DUS) database 113, a cloud hosted management server 112, and a gateway device 115. The gateway device 115 connects the cloud hosted management server 112 to the public network 120 so that the cloud hosted management server 112 is able to communicate with one or more LANs and/or geographically distributed portions of a VLAN, and includes features such as a firewall. In some implementations, the gateway device 115 is provided as a single entity (e.g., a server, a virtual machine, etc.). In some implementations, the gateway device 115 includes a distributed system including a suitable combination of software, data structures, virtual machines, computing devices, servers, switches and routers. Merely for the sake of brevity and convenience of explanation, the gateway device 115 is described herein as a single entity.

In some implementations, the ISP node 140 is provided to link the LAN 150 to the public network 120, and serves as a network service provider access point. Similar to the gateway nodes 115, 151, in various implementations, the ISP node 150 is provided as a single entity (e.g., a server, a virtual machine, etc.). In some implementations, the ISP node 150 is implemented as a distributed system including a suitable combination of software, data structures, virtual machines, computing devices, servers, switches and routers. For the sake of brevity and convenience of explanation, the ISP node 150 is described herein as a single entity.

Figure 2:
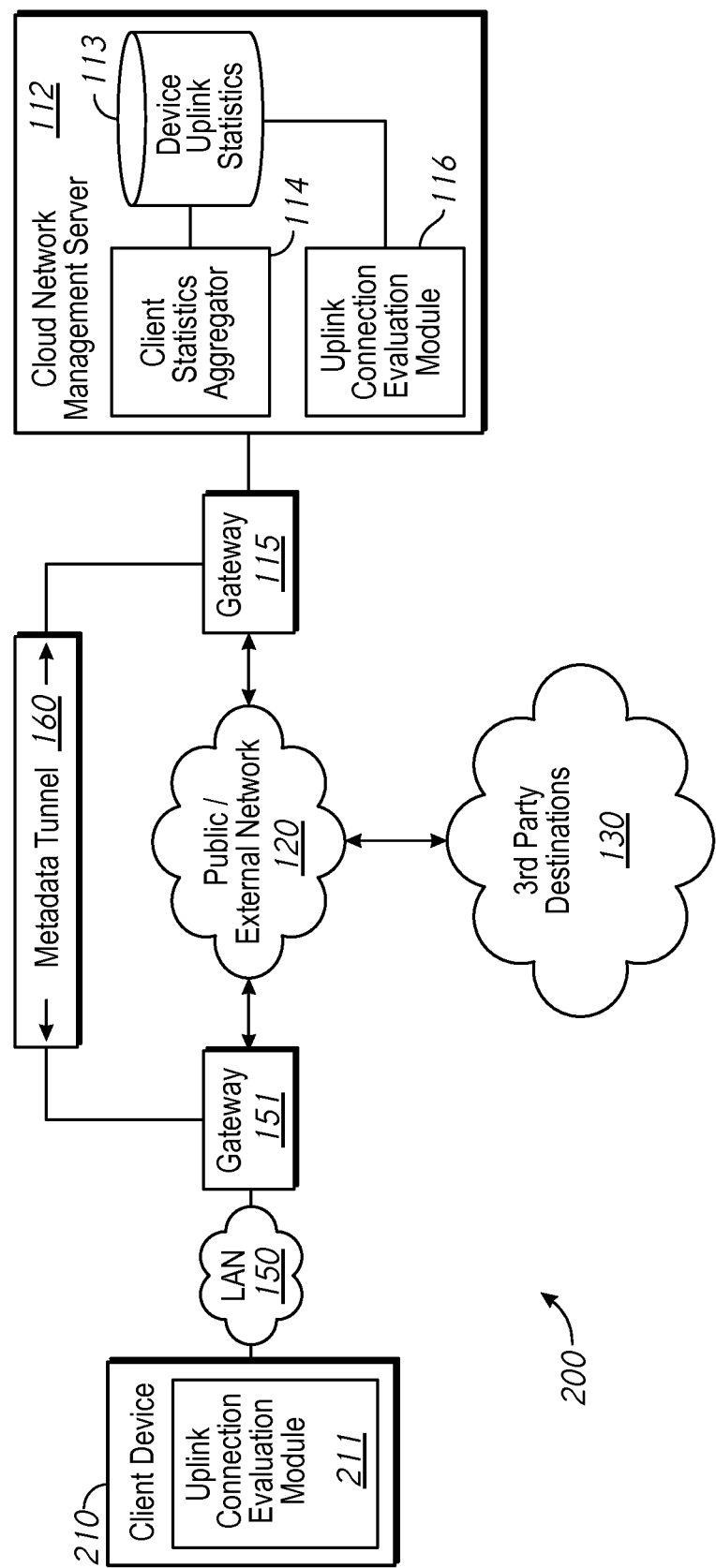
FIG. 2 is a block diagram of a data networking environment in accordance with some implementations.

FIG. 2 is a block diagram of a data networking environment 100 in accordance with some implementations. The data networking environment 200 shown in FIG. 2 is similar to and adapted from the data networking environment 100 shown in FIG. 1. Elements common to FIGS. 1 and 2 include common reference numbers, and only the differences between FIGS. 1 and 2 are described herein for the sake of brevity.

To that end, FIG. 2 illustrates a simplified arrangement including a client device 210 and the cloud hosted management server 112 shown in the context of a networking environment. The client device 210 is included in the LAN 150 behind the LAN gateway node 151. In some implementations, the client device 210 includes an uplink evaluation module 211, the function and operation of which is described in greater detail below with reference to FIGS. 3, 4 and 7. In some implementations, the cloud hosted management server 112 includes a client statistics aggregator module 114 and an uplink connection evaluation module 116, the function and operation of both of which are described in greater detail below with reference to FIGS. 5, 6 and 8.

FIG. 2 also illustrates the metadata tunnel 160 as being a conceptually separate communication channel between the respective gateway nodes 151, 115, as compared to the public/external network 120 (e.g., a portion of the Internet). In some implementations, the metadata tunnel 160 utilizes portions of the public/external network 120. To that end, in some implementations, metadata tunnel packets are marked and/or contain header fields that enable the prioritization of metadata tunnel packets on at least some portions of the public/external network 120. In some implementations, the prioritization of metadata tunnel packets includes the use of dedicated routing paths between client devices and the cloud hosted management server 112 in order to reduce latency and/or improve reliability. In some implementations, the prioritization of metadata tunnel packets includes bandwidth reservations for metadata tunnel traffic on at least one routing path between one or more client devices and the cloud hosted management server 112.

Figure 3:
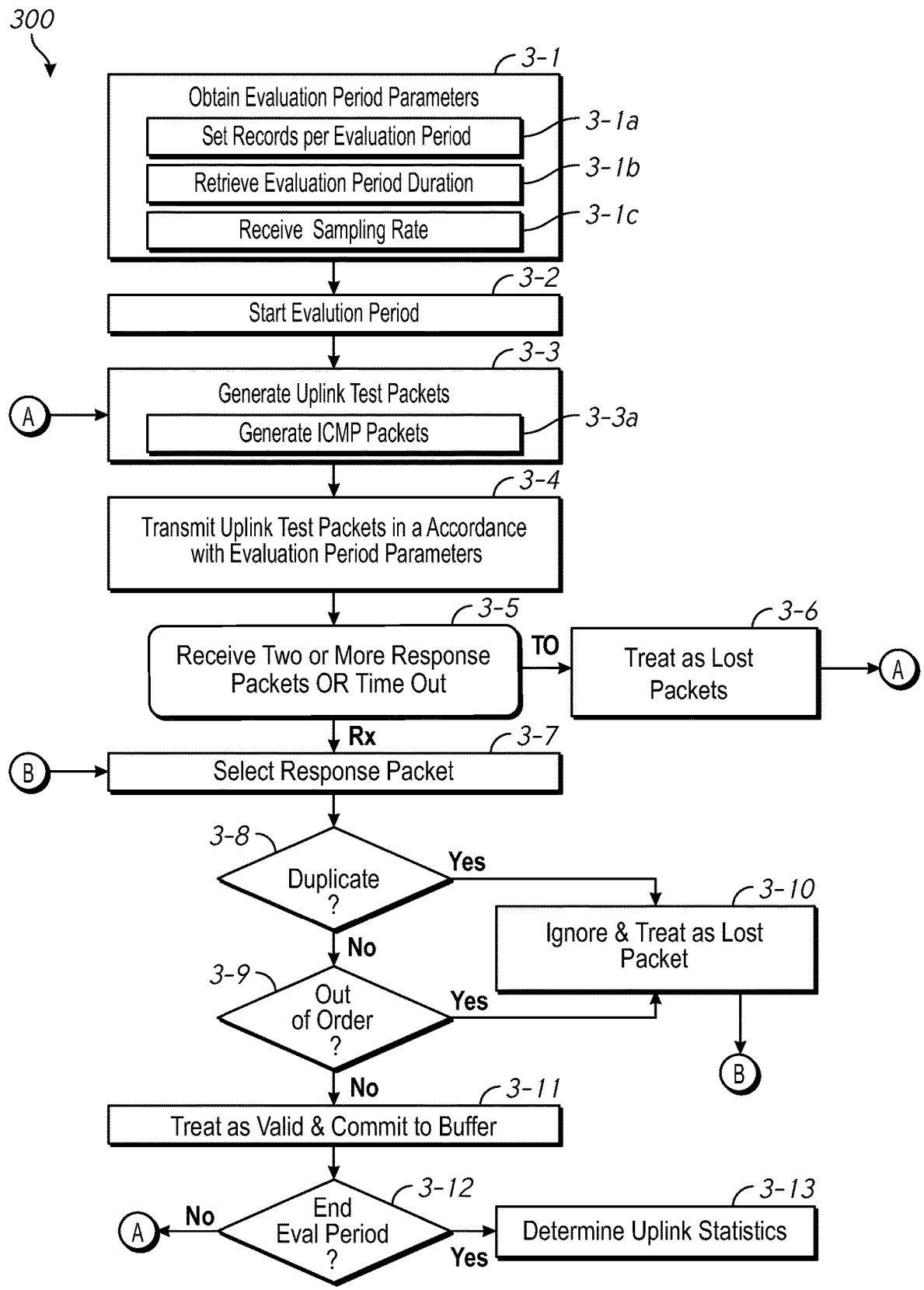
FIG. 3 is a flowchart representation of a method of uplink performance monitoring and management in accordance with some implementations.

FIG. 3 is a flowchart representation of a method 300 of uplink performance monitoring and management according to some implementations. In various implementations, the method 300 is performed by an uplink connection evaluation module (e.g., uplink connection evaluation module 211 shown in FIG. 2) included and/or associated with a client device (e.g., laptop 157a, workstation 157b, smartphone 157c, shown in FIG. 1). Briefly, the method 300 includes transmitting a plurality of uplink test packets from a client device, determining a response to the transmission of the plurality of uplink test packets through a network service provider access point, and generating one or more uplink performance values in accordance with the determined response. The client device is located on one side of the network service provider access point, and the destination is located on the other such that the plurality of uplink test packets traverse the network service provider access point. The one or more uplink performance values characterize how uplink traffic is handled between the client device and the destination both to and beyond the network service provider access point.

To that end, as represented by block 3-1, the method 300 includes obtaining evaluation period parameters that are used to characterize uplink performance in association with a time condition (e.g., between specified start and stop times, within a sliding window, periodically, or continuously during operation, etc.). In some implementations, as represented by block 3-1a, obtaining evaluation period parameters includes setting (or determining) the number of records to be generated during the evaluation period. In some implementations, as represented by block 3-1b, obtaining evaluation period parameters includes retrieving a duration defining the evaluation period from a non-transitory memory and/or receiving the duration from a cloud hosted management system (e.g., the cloud hosted network management system 110 of FIG. 1). In some implementations, as represented by block 3-1c, obtaining evaluation period parameters includes receiving a sampling rate from a non-transitory memory and/or retrieving the sampling rate from a cloud hosted management system.

As represented by block 3-2, the method 300 includes starting the evaluation period in accordance with the evaluation period parameters. As represented by block 3-3, the method 300 includes generating uplink test packets that are used to evaluate the performance of the uplink from the client device to a destination (e.g., third party destinations 130 of FIG. 1) beyond a respective network service provider access point (e.g., the ISP node 140 of FIG. 1). In some implementations, each of the uplink test packets includes an indicator configured to prompt the transmission of a corresponding response packet. In some implementations, as represented by block 3-3a, generating uplink test packets includes generating packets that substantially conform to Internet Control Message Protocol (ICMP) ping and/or traceroute packets. Those of ordinary skill in the art will appreciate from the present disclosure that ICMP is included in the Internet Protocol Suite, defined by RFC 792. In some implementations, ICMP packets are generated to conform to standard IP packets, because in some networks ICMP packets are processed on a priority basis, distinguished from normal IP processing, rather than processed as a normal sub-protocol of IP. In some implementations, as described below in greater detail with reference to FIG. 4, ICMP packets are generated in a disguised form, in order to improve monitoring accuracy with some networks that intentionally drop ICMP packets in order to limit network congestion during period of high bandwidth utilization.

As represented by block 3-4, the method 300 includes transmitting the uplink test packets in accordance with the obtained evaluation period parameters. For example, with reference to FIG. 1, the laptop 157a transmits uplink test packets to one of the third party destinations 130. In accordance with example evaluation period parameters, the laptop 157a transmits the uplink test packet by at least one of transmitting: between specified start and stop times; within a sliding window; periodically over a specified duration; and, periodically or continuously during ongoing operation. In various implementations, the uplink performance packets are time-stamped by the client device so that the order of transmission is determinable from the time-stamps. In another example, with reference to FIG. 2, the client device 210 transmits the uplink test packets to the cloud hosted network management server 112 outside of the metadata tunnel 160 so that the uplink test packets do not benefit from special handling policies associated with the metadata tunnel 160.

As represented by block 3-5, the method 300 includes determining whether or not two or more response packets are received within a specified timeout period. The response packets are sent by the addressed destination in response to one or more of the uplink test packets transmitted by a client device from behind a respective network service provider access point (e.g., the ISP node 140 of FIG. 1). In other words, ICMP packets, once received, typically prompt a response from the receiving device or system. If two or more response packets are not received within the specified timeout period ("TO" path from block 3-5), as represented by block 3-6, the method 300 includes determining that the uplink test packets have been lost—which increases the loss rate. Subsequently, the method 300 loops back to the portion of the method represented by block 3-3. On the other hand, assuming a live bidirectional link, when two or more packets are received ("Rx" path from block 3-5), as represented by block 3-7, the method 300 includes selecting a response packet from an incoming response packet buffer. In various implementations, response packets are selected from the incoming response packet buffer on a first-in-first-out (FIFO) basis, because FIFO corresponds to the order in which the response packets are received by the client device.

Sometimes duplicate response packets are received in response to a single uplink test packet as a result of an error by the destination device or system selected by the client device. If unchecked, destination processing errors reduce the accuracy of the uplink performance statistics generated by the transmitting client device. For example, duplicate response packets may result in more response packets being received than uplink test packets sent. It is then possible to achieve a delivery percentage that is greater than 100%, and a corresponding loss rate that is less than 0% (i.e., a negative loss rate)—both of which are invalid results. In order to guard against duplicate response packets, in some implementation response packets are validated before being used to generate uplink performance statistics. For example, as represented by block 3-8, in some implementations, the method 300 includes determining whether or not the selected response packet is a duplicate of a previously received and validated response packet. In some implementations, determining whether or not the selected response packet is a duplicate of a previously received and validated response packet includes comparing the selected packet against one or more previously received and validated packets that have been previously committed to a valid response buffer. If the selected packet is a duplicate of a previously received and validated response packet ("Yes" path from block 3-8), as represented by block 3-10, the method 300 includes discarding the selected packet and treating the selected packet as a response to a lost uplink test packet. Subsequently, the method 300 proceeds to the portion of the method represented by 3-12 (described below).

On the other hand, if the selected packet is not a duplicate of a previously received and validated response packet ("No" path from block 3-8), as represented by block 3-9, the method 300 includes determining whether or not the selected packet has been received out of order with respect to previously received and validated response packets. As noted above, uplink test packets are time-stamped based on the time at which each is transmitted from the client device. As such, the time-stamps of the uplink test packets indicate the correct transmission order of the uplink test packets. Similarly, the response packets are also time-stamped based on the time at which each is transmitted by the corresponding destination selected by the client device. As such, the time-stamps of the response packets also indicate the correct transmission order of the response packets, with the response packets having time-stamps that are correlated with time-stamps of respective uplink test packets. If the selected packet is out of order such that it has a time-stamp that is earlier than the last previously received and validated response packet ("Yes" path from block 3-9), as represented by block 3-10, the method 300 includes discarding the selected packet and treating the selected packet as a response to a lost uplink test packet. On the other hand, if the selected packet is not out of order ("No" path from block 3-9), as represented by block 3-11, the method 300 includes treating the response packet as valid and committing it to the valid response buffer.

Subsequently, as represented by block 3-12, the method 300 includes determining whether or not to end the evaluation period based on the evaluation period parameters. In some implementations, the evaluation period ends after a specified duration (e.g., between specified start and stop times, within a sliding window, periodically over a duration, etc.). In some implementations, the evaluation period ends after a pre-specified number of valid records have been produced. In some implementations, the evaluation period ends in response to collecting a pre-specified number of samples. In some implementations, the evaluation period ends after one or more performance criteria have been validated and/or satisfied. If it is determined that the evaluation period is not yet complete ("No" path from block 3-12), the method 300 loops back to the portion of the method represented by block 3-3. On the other hand, if it is determined that the evaluation period is sufficiently complete ("Yes" path from block 3-12), as represented by block 3-13, the method includes determining uplink performance statistics (i.e., values) based on the combination of the uplink test packets and the received response packets. For example, in some implementations, the uplink performance statistics characterize at least one of loss rate, latency, jitter, and percentage uptime. In some implementations, the uplink performance statistics characterize at least one of an estimate of per-packet drops, an estimate of one-way transmission delay, an estimate of round-trip transmission delay, an implicit congestion delay indicator value, and an explicit congestion delay value.

Figure 4:
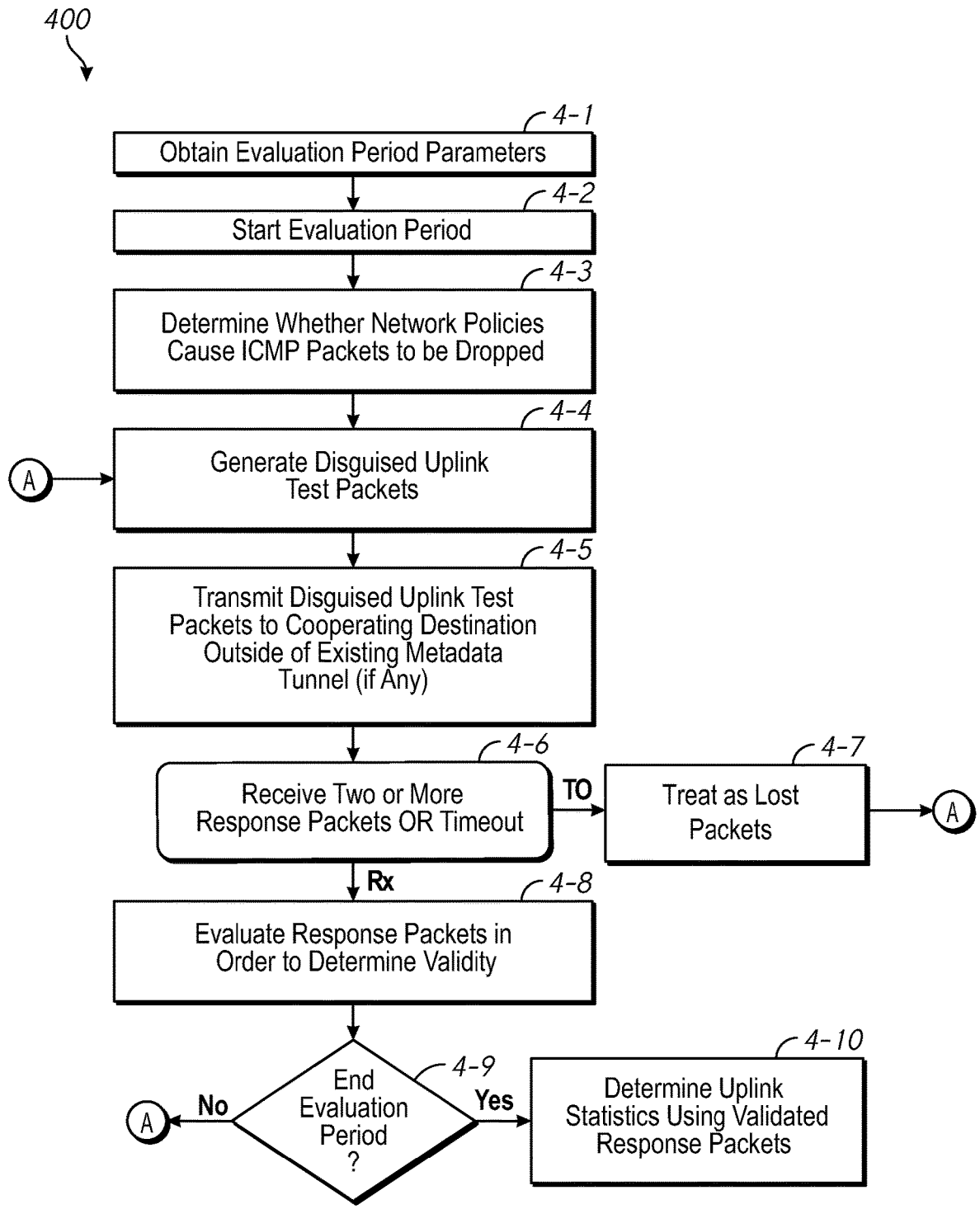
FIG. 4 is a flowchart representation of a method of uplink performance monitoring and management in accordance with some implementations.

FIG. 4 is a flowchart representation of a method 400 of uplink performance in accordance with some implementations. In various implementations, the method 400 is performed by an uplink connection evaluation module (e.g., uplink connection evaluation module 211 shown in FIG. 2) included and/or associated with a client device (e.g., laptop 157a, workstation 157b, smartphone 157c, shown in FIG. 1). Briefly, the method 400 includes transmitting a plurality of disguised uplink test packets from a client device, determining a response to the transmission of the plurality of disguised uplink test packets through a network service provider access point, and generating one or more uplink performance values in accordance with the determined response. The client device is located on one side of the network service provider access point, and the destination is located on the other such that the plurality of disguised uplink test packets traverse the network service provider access point. The one or more uplink performance values characterize how uplink traffic is handled between the client device and the destination both to and beyond the network service provider access point.

As represented by block 4-1, the method 400 includes obtaining evaluation period parameters that are used to characterize uplink performance in association with a time condition as, for example, described above with reference to FIG. 3. As represented by block 4-2, the method 400 includes starting the evaluation period in accordance with the evaluation period parameters.

As noted above, some networks intentionally drop ICMP packets in order to limit network congestion during periods of high bandwidth utilization. Network policies that support the intentional dropping of ICMP packets are based on the assumption that ICMP packets (and the like) are diagnostic or overhead traffic that do not directly benefit user experience metrics and/or network QoS metrics, and in some cases can reduce user experience metrics and/or network QoS metrics. However, such policies also make it difficult to accurately monitor uplink performance because it is not generally possible to distinguish packets lost due to enforcement of network policies from packets lost due to performance errors. As would be understood by those of ordinary skill in the art, a determination of packet loss is typically inferred from not receiving a response, which makes it difficult to precisely determine the cause of a particular packet loss without more information. In order to improve the accuracy of uplink performance monitoring, in some implementations methods include determining that enforcement of network policies purposefully cause ICMP packet drops, and subsequently working around such network policies.

To that end, with continued reference to FIG. 4, as represented by block 4-3, the method 400 includes determining that network policies cause ICMP packets to be dropped on one or more network segments connecting the client device to a destination device or system (e.g., third party destinations 130 of FIG. 1). In turn, as represented by block 4-4, the method 400 includes generating disguised uplink test packets (e.g. disguised ICMP packets). In some implementations, disguising uplink test packets includes placing an ICMP packet within a packet wrapper to make the ICMP packet appear to be a normal traffic bearing packet to networking equipment. In some implementations, disguising uplink test packets includes generating data bearing packets that include a flag and/or field that prompts a receiving destination device or system to provide an acknowledgement packet with a similar flag and/or field.

As represented by block 4-5, the method 400 includes transmitting the disguised uplink test packets in accordance with the obtained evaluation period parameters to a cooperating destination device or system. In some implementations, the disguised uplink test packets are transmitted outside of a metadata tunnel (if any) so that the disguised uplink test packets do not benefit from special handling policies associated with the metadata tunnel. To that end, in various implementations, the disguised ICMP packets are produced so as not include markings and/or header fields that enable the prioritization of metadata tunnel packets. For example, with reference to FIG. 2, the client device 210 transmits the uplink test packets to the cloud hosted network management server 112 (cooperating destination) outside of the metadata tunnel 160 so that the uplink test packets do not benefit from special handling policies associated with the metadata tunnel 160.

As represented by block 4-6, the method 400 includes determining whether or not two or more response packets are received within a specified timeout period. The response packets are sent by the addressed destination in response to one or more of the uplink test packets transmitted by the client device from behind a respective network service provider access point (e.g., the ISP node 140 of FIG. 1). In other words, ICMP packets, once received, typically prompt a response from the receiving device or system. If two or more response packets are not received within the specified timeout period ("TO" path from block 4-6), as represented by block 4-7, the method 400 includes determining that the uplink test packets have been lost—which increases the loss rate. Subsequently, the method 400 loops back to the portion of the method represented by block 4-4. On the other hand, assuming a live bidirectional link, when two or more packets are received ("Rx" path from block 4-6), as represented by block 4-8, the method 400 includes evaluating the response packets in order to determine the validity of each of the received response packets, as for example, described above with reference to FIG. 3.

Subsequently, as represented by block 4-9, the method 400 includes determining whether or not to end the evaluation period based on the evaluation period parameters. In some implementations, the evaluation period ends after a specified duration (e.g., between specified start and stop times, within a sliding window, periodically over a duration, etc.). In some implementations, the evaluation period ends after a pre-specified number of valid records have been produced. In some implementations, the evaluation period ends in response to collecting a pre-specified number of samples. In some implementations, the evaluation period ends after one or more performance criteria have been validated and/or satisfied. If it is determined that the evaluation period is not yet complete ("No" path from block 4-9), the method 400 loops back to the portion of the method represented by block 4-4. On the other hand, if it is determined that the evaluation period is sufficiently complete ("Yes" path from block 4-9), then as represented by block 4-10, the method 400 includes determining uplink performance statistics. For example, in some implementations, the uplink performance statistics characterize at least one of loss rate, latency, jitter, and percentage uptime. In some implementations, the uplink performance statistics characterize at least one of an estimate of per-packet drops, an estimate of one-way transmission delay, an estimate of round-trip transmission delay, an implicit congestion delay indicator value, and an explicit congestion delay value.

Figure 5:
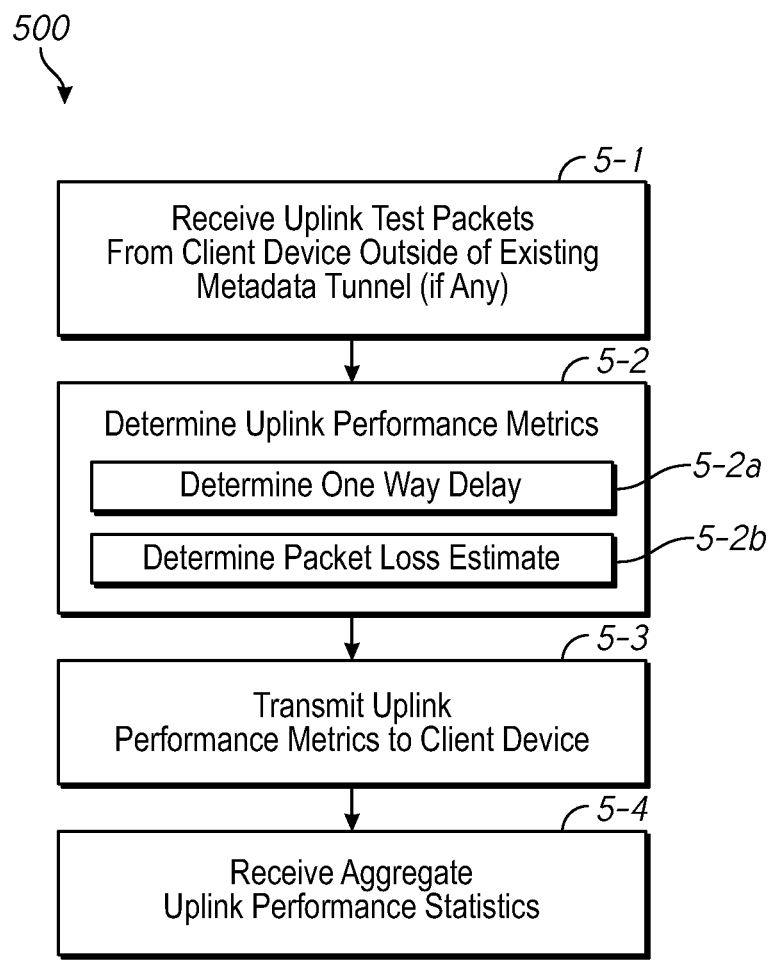
FIG. 5 is a flowchart representation of a method of uplink performance monitoring and management in accordance with some implementations.

FIG. 5 is a flowchart representation of a method 500 of uplink performance in accordance with some implementations. In various implementations, the method 500 is performed by a cooperating destination, such as the cloud hosted network management server 112 of FIGS. 1 and 2. Briefly, the method 500 includes determining uplink performance metrics based on received uplink test packets from one or more client devices, and providing the uplink performance metrics to the one or more client devices.

To that end, as represented by block 5-1, method 500 includes receiving uplink test packets from a client device outside of an existing metadata tunnel (if any). For example, with reference to FIG. 1, the cloud hosted network management server 112 receives uplink test packets from the smartphone 157*c*.

As represented by block 5-2, the method 500 includes determining uplink performance metrics from the received uplink test packets. For example, in some implementations, as represented by block 5-2*a*, determining uplink performance metrics includes determining one way delay by comparing the transmission time-stamp within an uplink test packet to the arrival time at the receiving destination. In some implementations, as represented by block 5-2*b*, determining uplink performance metrics includes determining a packet loss estimate by determining if one or more uplink test packets are lost from within a sequentially labeled set of uplink test packets. In some implementations, determining a packet loss includes identifying at least a one packet gap between otherwise sequentially labeled packets. Additionally, in some implementations, the uplink performance metrics characterize at least one of loss rate, latency, jitter, and percentage uptime. In some implementations, the uplink performance statistics characterize at least one of an estimate of per-packet drops, an estimate of one-way transmission delay, an estimate of round-trip transmission delay, an implicit congestion delay indicator value, and statistics for explicit congestion notification delay (ECN) markings.

As represented by block 5-3, the method 500 includes transmitting uplink performance metrics to the client device. For example, with reference to FIG. 1, the cloud hosted network management server 112 transmits one or more uplink performance metrics to the smartphone 157*c* in response to receiving a number of uplink test packets from the smartphone 157*c*. As represented by block 5-4, the method 500 includes receiving aggregate uplink performance statistics from one or more client devices. For example, with reference to FIG. 1, the cloud hosted network management server 112 receives aggregate uplink performance statistics from each of the laptop 157*a*, the workstation 157*b*, and the smartphone 157*c*. In some implementations, a cloud hosted network management server cooperatively develops the aggregate uplink performance statistics received from each of one or more client devices. In some implementations, a cloud hosted network management server does not cooperatively develop the aggregate uplink performance statistics received from each of one or more client devices.

Figure 6:
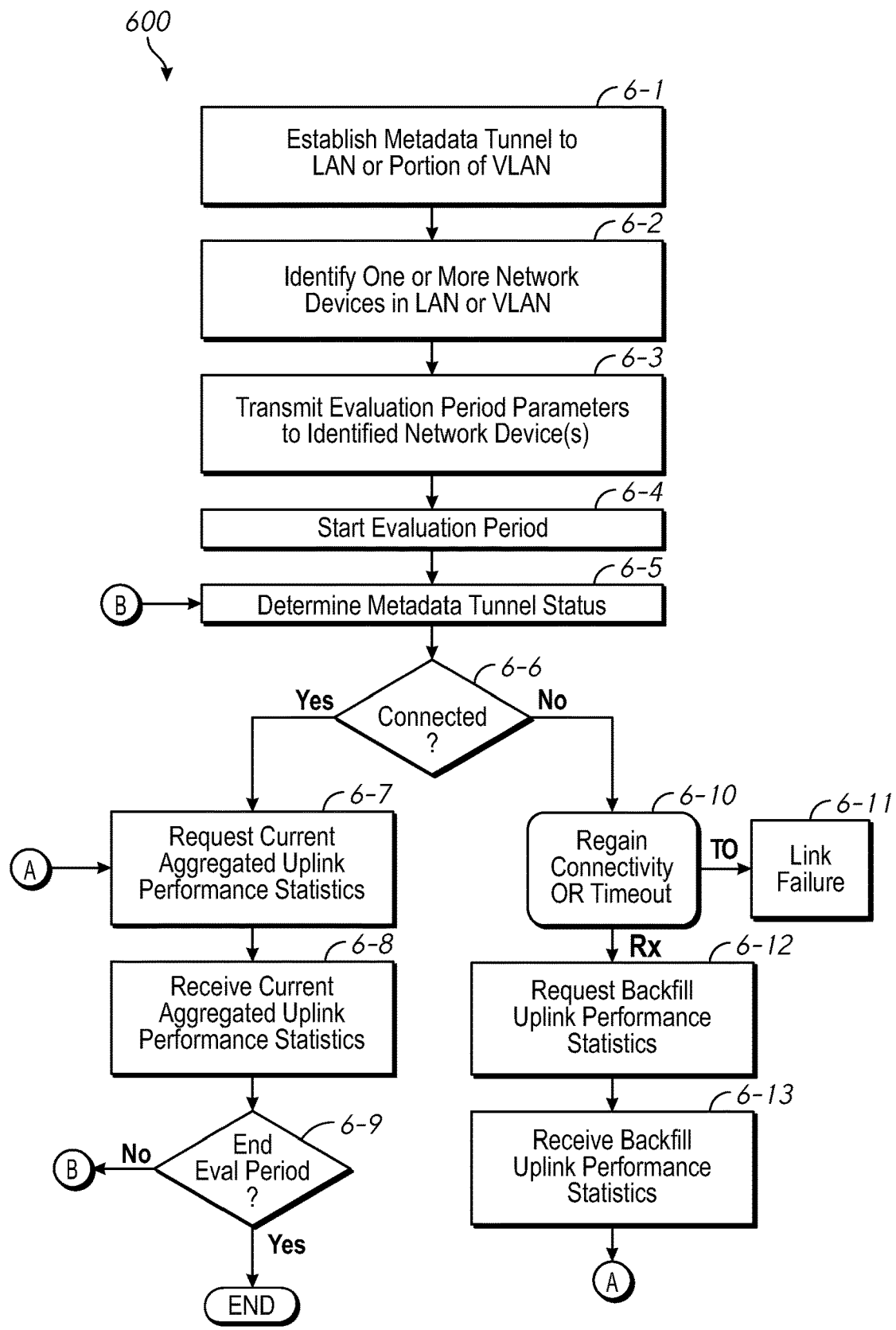
FIG. 6 is a flowchart representation of a method of uplink performance monitoring and management in accordance with some implementations.

FIG. 6 is a flowchart representation of a method 600 of uplink performance in accordance with some implementations. In various implementations, the method 600 is performed by a cooperating destination, such as the cloud hosted network management server 112 of FIGS. 1 and 2. Briefly, the method 600 includes identifying compliant devices within a LAN, and periodically collecting aggregated uplink performance statistics using and based on the availability of a metadata tunnel.

To that end, as represented by block 6-1, method 600 includes establishing a metadata tunnel to a LAN or a portion of a VLAN. For example, with reference to FIG. 1, the cloud hosted management server 112 establishes the metadata tunnel 160 to the LAN 150. As noted above, the metadata tunnel 160 extends between the gateway 115 of the cloud hosted management system 110 and the gateway node 151 of the LAN 150, through portions of the Internet 120 and the infrastructure of the ISP 140.

As represented by block 6-2, the method 600 includes identifying the compliant devices within the LAN by requesting, receiving and using uplink metadata from the compliant devices. For example, with reference to FIG. 1, the cloud hosted management server 112 produces and transmits a broadcast query through the metadata tunnel 160, which is received by the gateway node 151. The gateway node 151 then broadcasts the query to all of the compliant and non-compliant devices 153, 155 in the LAN 150 through the network root node 152. In another example, when the method 300 is performed locally by and/or in coordination with a gateway node of a LAN, the gateway node 151 produces and transmits a broadcast query for uplink metadata without utilizing a metadata tunnel to a system or device external to the LAN. In some implementations, the compliant devices also include client devices (e.g., the laptop 157*a*, the workstation 157*b*, the smartphone 157*c*, etc.), which are configured to provide uplink metadata in response to the broadcast query. In other words, the method 600 includes receiving information from the networking devices and the client devices within a LAN that are configured to report uplink information in response to receiving a suitable reporting request, such as the broadcast query. In various implementations, uplink information is provided in a conforming frame that includes a first device identifier of the reporting device, a port identifier of the port of the reporting device that is used for transmitting externally addressed traffic, and optionally a second device identifier of a device that is connected to the port. In various implementations, the uplink metadata from compliant devices conforms to at least one of a number of link layer discovery protocols, such as LLDP, CDP, EDP, FDP, SONMP, LLTD, etc. Non-compliant devices (e.g., non-compliant devices 155) are not configured to properly respond to a reporting request, and will often ignore the request. However, in some instances, a non-compliant device may respond with an error packet that includes at least one of its own device identifier, its IP address, and its MAC address.

As represented by block 6-3, the method 600 includes transmitting evaluation period parameters to the identified devices. For example, with reference to FIG. 1, the cloud hosted network management server 112 transmits evaluation period parameters to a combination of one or more of the compliant devices 153 and the client devices 157. As noted above with reference to FIG. 3, the evaluation period parameters are used to characterize uplink performance in association with a time condition (e.g., between specified start and stop times, within a sliding window, periodically, or continuously during operation, etc.).

As represented by block 6-4, the method 600 includes starting the evaluation period in accordance with the evaluation period parameters. As represented by block 6-5, the method 600 includes determining the metadata tunnel status (e.g., connected vs disconnected, etc.). In some instances, the LAN 150 or individual devices with the LAN 150 can become temporarily disconnected from the metadata tunnel 160 while nevertheless maintaining live bidirectional links. When this occurs the metadata tunnel 160 is unavailable for collecting aggregated uplink performance statistics from the client devices 157.

Various implementations provide one or more remedial measures aimed at addressing temporary metadata tunnel downtime. To that end, as represented by block 6-6, the method 600 includes determining whether the metadata tunnel status indicates that the metadata tunnel is connected. If the metadata tunnel is connected ("Yes" path from block 6-6), as represented by block 6-7, the method 600 includes requesting current aggregated uplink performance statistics from one or more client devices (and/or compliant devices). For example, with reference to FIG. 1, the cloud hosted network management server 112 transmits a request to the client devices 157 over the live metadata tunnel 160. Subsequently, as represented by block 6-8, the method 600 includes receiving aggregate uplink performance statistics from one or more client devices. For example, with reference to FIG. 1, the cloud hosted network management server 112 receives aggregated uplink performance statistics from each of the laptop 157*a*, the workstation 157*b*, and the smartphone 157*c*.

As represented by block 6-9, the method 600 includes determining whether or not to end the evaluation period based on the evaluation period parameters, as for example described above with reference to FIGS. 3 and 4. In some implementations, the evaluation period ends after a specified duration (e.g., between specified start and stop times, within a sliding window, periodically over a duration, etc.). In some implementations, the evaluation period ends after a pre-specified number of valid records have been produced. In some implementations, the evaluation period ends in response to collecting a pre-specified number of samples. In some implementations, the evaluation period ends after one or more performance criteria have been validated and/or satisfied. If it is determined that the evaluation period is not yet complete ("No" path from block 6-9), the method 600 loops back to the portion of the method represented by block 6-5. On the other hand, if it is determined that the evaluation period is sufficiently complete ("Yes" path from block 6-9), the method concludes for the evaluation period.

Referring again to block 6-6, if the metadata tunnel is not connected ("No" path from block 6-6), as represented by block 6-10, the method 600 includes determining whether or not metadata tunnel connectivity is regained within a specified timeout period. If metadata tunnel connectivity is not regained within the specified timeout period ("TO" path from block 6-10), as represented by block 6-11, the method 600 includes determining that a link failure has occurred, and signaling or activating another portion of the system accordingly. For example, with reference to FIG. 1, the cloud hosted network management server 112 requests and receives the aggregated uplink performance statistics without the metadata tunnel by using other portions of the public/external network 120 that are not reserved for metadata tunnel traffic. On the other hand, if metadata tunnel connectivity is regained within the specified timeout period ("Rx" path from block 6-10), as represented by block 6-12, the method 600 includes requesting backfill uplink performance statistics. For example, with reference to FIG. 1, the cloud hosted network management server 112 requests aggregated uplink performance statistics from one or more of the client devices 157 for at least the time period during which the metadata tunnel was disconnected and the cloud hosted network management server 112 was unable to request and receive aggregated uplink performance statistics using the metadata tunnel. In turn, as represented by block 6-13, the method 600 includes receiving backfill uplink performance statistics from one or more client devices. For example, with reference to FIG. 1, the cloud hosted network management server 112 receives backfill uplink performance statistics from each of the laptop 157a, the workstation 157b, and the smartphone 157c. Subsequently, the method proceeds to the portion of the method represented by block 6-7 (described above).

Figure 7:
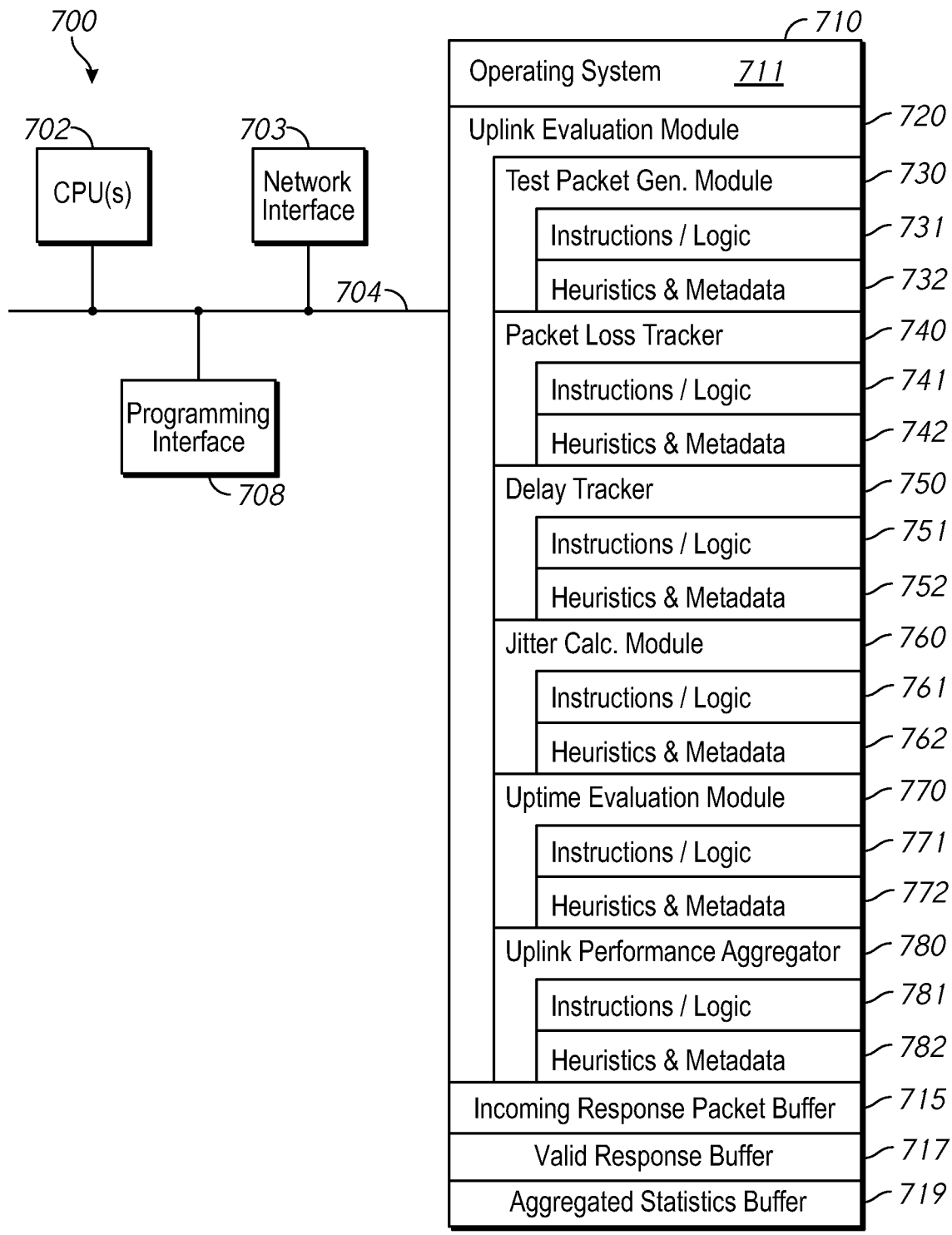
FIG. 7 is a block diagram of a client device enabled with an uplink performance monitoring and management system in accordance with some implementations.

FIG. 7 is a block diagram of a client device 700 enabled with an uplink performance monitoring system in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the client device 700 includes one or more processing units (CPU's) 702, a network interface 703, a memory 710, a programming interface 705, and one or more communication buses 704 for interconnecting these and various other components.

In some implementations, the network interface 703 is provided, among other uses, to transmit a plurality of uplink test packets from the client device 700, that is located on one side of a network service provider access point, to a destination that is located on the other side of the network service provider access point, such that the plurality of uplink test packets traverse the network service provider access point.

In some implementations, the communication buses 704 include circuitry that interconnects and controls communications between system components. The memory 710 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 710 optionally includes one or more storage devices remotely located from the CPU(s) 702. The memory 710 comprises a non-transitory computer readable storage medium. In some implementations, the memory 710 or the non-transitory computer readable storage medium of the memory 710 stores the following programs, modules and data structures, or a subset thereof including an operating system 711, an uplink evaluation module 720, an incoming response packet buffer 715, a valid response buffer 717, and an aggregated statistics buffer 719.

In some implementations, the incoming response packet buffer 715 is provided to store response packets received in response to uplink test packets or disguised uplink test packets transmitted by the client device 700. The incoming response packet buffer 715 is provided to store response packets as they are received without validation. As noted above, response packets are received from at least one of a third party destination and a cooperating destination. In some implementations, the valid response buffer 717 is provided to store response packets that have been validated against other response packets, as for example described above with reference to FIG. 3. In some implementations, the aggregated statistics buffer 719 is provided to store aggregated uplink performance statistics produced by the uplink evaluation module 720 before the aggregated uplink performance statistics are transmitted to a cloud hosted network management system.

The operating system 711 includes procedures for handling various basic system services and for performing hardware dependent tasks.

In some implementations, the uplink evaluation module 720 is configured to assess the performance of an uplink channel from the client device 700 to at least one of a third party destination and a cooperating destination located beyond a respective network service provider access point (e.g., ISP node 140 of FIG. 1). To that end, in various implementations, the uplink evaluation module 720 includes an uplink test packet generator 730, a packet loss tracker 740, a delay tracker 750, a jitter calculation module 760, an uptime evaluation module 770, and an uplink performance aggregator 780. In various implementations, these and other modules included in the client device 700 include a suitable combination of software, hardware and/or firmware including digital logic, machine-executable computer code instructions and programmable logic.

In some implementations, the uplink test packet generator 730 is configured to produce uplink test packets. In some implementations, generating uplink test packets includes generating packets that substantially conform to ICMP ping and/or traceroute packets. In some implementations, ICMP packets are generated in a disguised form in order to improve monitoring accuracy in association with some networks that intentionally drop ICMP packets in order to limit network congestion during period of high bandwidth utilization. To that end, in various implementations, the uplink test packet generator 730 includes instructions and/or logic 731, and heuristics and metadata 732.

In some implementations, the packet loss tracker 740 is configured to track the loss of uplink test packets. In some implementations, an uplink test packet is determined to be lost when a response packet is not received corresponding to the uplink test packet within a response time window. In some implementations, an uplink test packet is determined to be lost when two or more response packets are received corresponding to the same uplink test packet. In some implementations, an uplink test packet is determined to be lost when a response packet is received out of order with respect to a corresponding uplink test packet included in a sequential set of uplink test packets. To that end, in various implementations, the packet loss tracker 740 includes instructions and/or logic 741, and heuristics and metadata 742.

In some implementations, the delay tracker 750 is configured to estimate and track the round trip transmission delay from the client device 700 to at least one of a third party destination and a cooperating destination located beyond a respective network service provider access point (e.g., ISP node 140 of FIG. 1). In some implementations, round trip transmission delay is determined as a function of the initial transmission time of an uplink test packet and the time a corresponding response packet is received by the client device 700. In some implementations, multiple delay estimates are aggregated in order to create a set of one or more delay time statistics including, for example, mean delay, median delay, a standard deviation estimate. To that end, in various implementations, the delay tracker 750 includes instructions and/or logic 751, and heuristics and metadata 752.

In some implementations, the jitter calculation module 760 is configured to estimate the jitter on the uplink channel using a combination of the pertinent times associated with uplink test packets and response packets. To that end, in various implementations, the jitter calculation module 760 includes instructions and/or logic 761, and heuristics and metadata 762.

In some implementations, the uptime evaluation module 770 is configured to estimate the percentage of time that the uplink channel associated with the client device 700 is operating in accordance with a SLA. To that end, in various implementations, the uptime evaluation module 770 includes instructions and/or logic 771, and heuristics and metadata 772.

In some implementations, the uplink performance aggregator 780 is configured to aggregate uplink performance statistics provided by one or more of the other aforementioned modules. To that end, in various implementations, the uplink performance aggregator 780 includes instructions and/or logic 781, and heuristics and metadata 782.

Figure 8:
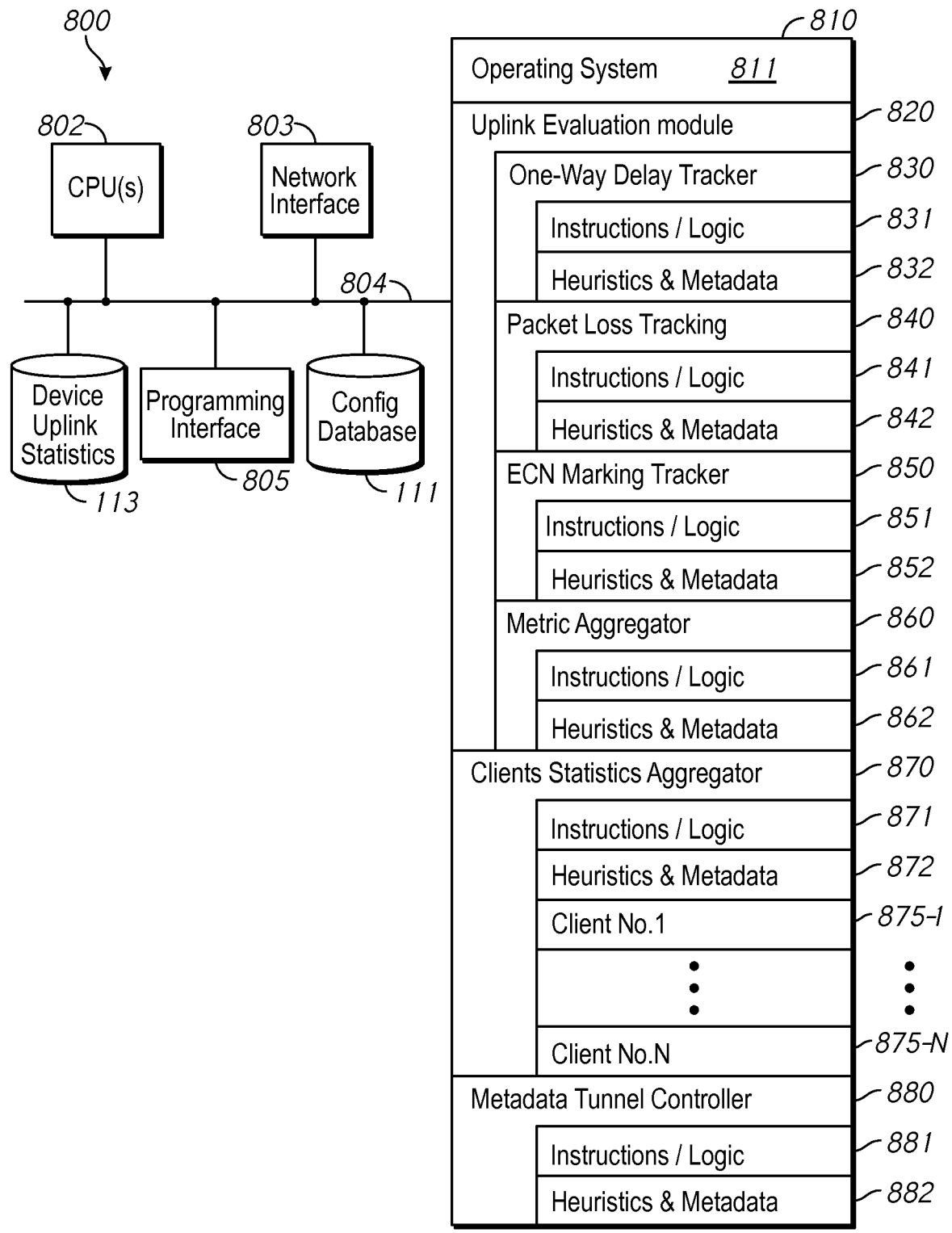
FIG. 8 is a block diagram of a server system enabled with an uplink performance monitoring and management system in accordance with some implementations.

FIG. 8 is a block diagram of a server system 800 enabled with an uplink performance monitoring system in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the server system 800 includes one or more processing units (CPU's) 802, a network interface 803, a memory 810, a programming interface 805, the configuration database 111, and the device uplink statistics database 113, and one or more communication buses 804 for interconnecting these and various other components.

In some implementations, the network interface 803 is provided, among other uses, to receive a plurality of uplink test packets from the client device, that is located on a side of a network service provider access point opposite to the server system 800; and transmit response packets to the client device that are generated by the server system 800 in response to receiving the plurality of uplink test packets.

In some implementations, the communication buses 804 include circuitry that interconnects and controls communications between system components. The memory 810 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 810 optionally includes one or more storage devices remotely located from the CPU(s) 802. The memory 810 comprises a non-transitory computer readable storage medium. In some implementations, the memory 810 or the non-transitory computer readable storage medium of the memory 810 stores the following programs, modules and data structures, or a subset thereof including an optional operating system 811, an uplink evaluation module 820, a client statistics aggregator 870, and a metadata tunnel controller 880.

The operating system 811 includes procedures for handling various basic system services and for performing hardware dependent tasks.

In some implementations, the uplink evaluation module 820 is configured to assess the performance of one or more respective uplink channels from a corresponding one or more client devices to the server system 800, which is provided as a cooperating destination (e.g., the cloud hosted network management server 112 of FIG. 1). To that end, in various implementations, the uplink evaluation module 820 includes a one-way delay tracker 830, a packet loss tracker 840, an ECN marking tracker 850, and a metric aggregator 860. In various implementations, these and other modules included in the server system 800 include a suitable combination of software, hardware and/or firmware including digital logic, machine-executable computer code instructions and programmable logic.

In some implementations, the one-way delay tracker 830 is configured to estimate and track the one-way transmission delay from a client device, behind a network service provider access point, to the server system 800. In some implementations, one-way delay transmission delay is determined as a function of the initial transmission time of an uplink test packet and a time the uplink packet is received by the server system 800. In some implementations, multiple delay estimates are aggregated in order to create a set of one or more delay time statistics including, for example, mean delay, median delay, a standard deviation estimate. To that end, in various implementations, the one-way delay tracker 830 includes instructions and/or logic 831, and heuristics and metadata 832.

In some implementations, the packet loss tracker 840 is configured to configured to track the loss of uplink test packets. In some implementations, an uplink test packet is determined to be lost when it is determined that a sequential set of uplink test packets, received by the service system 800, is missing a sequential one of the sequential set of uplink test packets. To that end, in various implementations, the packet loss tracker 840 includes instructions and/or logic 841, and heuristics and metadata 842.

In some implementations, the ECN markings tracker 850 is configured to track per-packet ECN markings (or the like) in the IP packet headers, and provide an indication of an equivalent delay associated with ECN marked packets. In order to support the functions described herein, in some implementations, the ECN markings tracking 850 includes a set of instructions 851 and heuristics and metadata 852.

In some implementations, the metric aggregator 860 is configured to combine the various metrics produced by the uplink evaluation module 820. In some implementations, the metric aggregator 860 produces a concatenated data structure including two or more of the metrics produced by the uplink evaluation module 820. In some implementations, the metric aggregator 860 produces a hash value including two or more of the metrics produced by the uplink evaluation module 820. In some implementations, the metric aggregator 860 produces an encoded value including two or more of the metrics produced by the uplink evaluation module 820. In order to support the functions described herein, in various implementations, the metric aggregator 860 includes a set of instructions 861 and heuristics and metadata 862.

In some implementations, the client statistics aggregator 870 is configured to collect and curate aggregated uplink performance statistics from one or more client devices. For example, in some implementations, the client statistics aggregator 870 operates in accordance with aspects of the method 600 described above with reference to FIG. 6. To that end, in various implementations, the client statistics aggregator 870 includes instructions and/or logic 871, and heuristics and metadata 872. In some implementations, the client statistics aggregator 870 also stores client device keys 875-1, ..., 875-N, that are used for storing and retrieving aggregated uplink performance statistics in the device uplink statistics database 113 associated with N client devices.

In some implementations, the metadata tunnel controller 880 is configured to establish a metadata tunnel to a LAN or a portion of a VLAN from the server system 800. For example, with reference to FIG. 1, the cloud hosted management server 112 establishes the metadata tunnel 160 to the LAN 150. As noted above, the metadata tunnel 160 extends between the gateway 115 of the cloud hosted management system 110 and the gateway node 151 of the LAN 150, through portions of the Internet 120 and the infrastructure of the ISP 140. To that end, in various implementations, the metadata tunnel controller 880 includes instructions and/or logic 881, and heuristics and metadata 882.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a client device including a processor and a non-transitory memory:
obtaining evaluation period parameters from a cloud hosted management system, the evaluation period parameters characterizing uplink performance in association with a time condition;
in accordance with the evaluation period parameters, transmitting a plurality of uplink test packets from the client device located on one side of a network service provider access point to a destination located on another side of the network service provider access point, such that the plurality of uplink test packets traverse the network service provider access point;
receiving, at the client device, a plurality of response packets in response to the transmitting of the plurality of uplink test packets through the network service provider access point;
determining one or more of the plurality of response packets are an indicator of one or more lost uplink test packets based on the one or more of the plurality of response packets being received within a response time window and being duplicates of a previously received one of the plurality of response packets; and
generating one or more uplink performance values based on the receiving of the plurality of response packets, the one or more uplink performance values characterizing how uplink traffic is handled between the client device and the destination both to and beyond the network service provider access point, the generating of the one or more uplink performance values including generating at least one uplink packet delivery performance value based on the indicator of the one or more lost uplink test packets.

2. The method of claim 1, wherein the destination includes at least one of a third party destination and a cooperating destination.

3. The method of claim 1, further comprising:
generating the plurality of uplink test packets, wherein each of the plurality of uplink test packets includes another indicator configured to prompt transmission of a corresponding one of the plurality of response packets.

4. The method of claim 3, wherein the plurality of uplink test packets are generated to conform to Internet Control Message Protocol (ICMP) packets.

5. The method of claim 4, wherein generating the plurality of uplink test packets comprises: determining that network policies cause ICMP packets to be dropped on one or more network segments connecting the client device to the destination; and generating disguised uplink test packets in response to determining that network policies cause ICMP packets to be dropped.

6. The method of claim 5, wherein disguising uplink test packets includes at least one of: placing an ICMP packet within a packet wrapper to make the ICMP packet appear to be a normal traffic bearing packet to networking equipment; and generating data bearing packets that include at least one of a flag and a field that prompts a receiving destination to provide an acknowledgement packet with a similar flag or field.

7. The method of claim 1, further comprising:
determining the one or more lost uplink test packets by evaluating the response packets to determine a validity of each of the plurality of response packets, and providing a set of validated response packets to determine the one or more lost uplink test packets.

8. The method of claim 1, further comprising:
determining the one or more lost uplink test packets by determining that at least one of the plurality of response packets is the duplicate.

9. The method of claim 1, further comprising:
determining the one or more lost uplink test packets by determining that at least one of the plurality of response packets is out of order with respect to a corresponding uplink test packet included in a sequential set of uplink test packets.

10. The method of claim 1, wherein the one or more uplink performance values are generated based on the evaluation period parameters that are used to characterize uplink performance in association with the time condition.

11. The method of claim 10, wherein the evaluation period parameters are characterized by at least one of start and stop times, a sliding window, periodic testing, and continuously during operation of the client device.

12. The method of claim 1, wherein the one or more uplink performance values include at least one of a loss rate value, a latency value, a jitter value, a percentage uptime value, an estimate of one-way transmission delay, an estimate of round-trip transmission delay, an implicit congestion delay indicator value, and an explicit congestion delay value.

13. A device comprising:
a network interface configured to transmit uplink test packets and receive response packets through a network service provider access point; and
a non-transitory memory including instructions that, when executed by one or more processors, cause the device to:
obtain evaluation period parameters from a cloud hosted management system, the evaluation period parameters characterizing uplink performance in association with a time condition;
in accordance with the evaluation period parameters, transmit a plurality of uplink test packets, using the network interface, to a destination located on the other side of the network service provider access point, such that the plurality of uplink test packets traverse the network service provider access point;
receive a plurality of response packets, using the network interface, in response to transmission of the plurality of uplink test packets through the network service provider access point;
when one or more of the plurality of response packets are not received within a response time window, determine the one or more of the plurality of response packets are an indicator of one or more lost uplink test packets;
when the one or more of the plurality of response packets are received within the response time window and is a duplicate of a previously received one of the plurality of response packets, determine the one or more of the plurality of response packets are the indicator of the one or more lost uplink test packets;

when the one or more of the plurality of response packets are received within the response time window, is not the duplicate, and is received out of order, determine the one or more of the plurality of response packets are the indicator of the one or more lost uplink test packets; and
generate one or more uplink performance values based on the receiving of the plurality of response packets, the one or more uplink performance values characterizing how uplink traffic is handled between the device and the destination both to and beyond the network service provider access point, generating the one or more uplink performance values including generating at least one uplink packet delivery performance value based on the indicator of the one or more lost uplink test packets.

14. The device of claim 13, wherein the instructions further cause the device to generate the plurality of uplink test packets, each of the plurality of uplink test packets including an indicator to prompt transmission of a corresponding one of the plurality of response packets.

15. The device of claim 14, wherein the instructions further cause the device to determine that network policies cause uplink test packets to be dropped on one or more network segments connecting the device to the destination; and generate disguised uplink test packets in response to determining that network policies cause uplink test packets to be dropped.

16. The device of claim 13, wherein the instructions further cause the device to evaluate the response packets to determine a validity of each of the plurality of response packets, and provide a set of validated ones of the plurality of response packets to determine a third number.

17. The device of claim 13, wherein the one or more uplink performance values include at least one of a loss rate value, a latency value, a jitter value, a percentage uptime value, an estimate of one-way transmission delay, an estimate of round-trip transmission delay, an implicit congestion delay indicator value, and an explicit congestion delay value.

18. A system comprising:
a network interface configured to:
obtain evaluation period parameters from a cloud hosted management system, the evaluation period parameters characterizing uplink performance in association with a time condition,
in accordance with the evaluation period parameters, transmit a plurality of uplink test packets from the network interface of a client device located on one side of a network service provider access point to a destination located on another side of the network service provider access point, such that the plurality of uplink test packets traverse the network service provider access point, and
receive a plurality of response packets in response to transmission of the plurality of uplink test packets through the network service provider access point; and
a processor configured to:
when one or more of the plurality of response packets are not received within a response time window, determine the one or more of the plurality of response packets are an indicator of one or more lost uplink test packets;
when the one or more of the plurality of response packets are received within the response time window and is a duplicate of a previously received one of the plurality of response packets, determine the one or more of the plurality of response packets are the indicator of the one or more lost uplink test packets;

when the one or more of the plurality of response packets are received within the response time window, is not the duplicate, and is received out of order, determine the one or more of the plurality of response packets are the indicator of the one or more lost uplink test packets, and generate one or more uplink performance values based on receiving of the plurality of response packets, the one or more uplink performance values characterizing how uplink traffic is handled between the client device and the destination both to and beyond the network service provider access point, the processor configured to generate at least one packet delivery performance value based on the indicator of the one or more lost uplink test packets.

\* \* \* \* \*